United States Patent
Palus et al.

(10) Patent No.: US 11,157,583 B2
(45) Date of Patent: Oct. 26, 2021

(54) SOFTWARE DETECTION BASED ON USER ACCOUNTS

(71) Applicant: International Business Machines Corporation, Armonk, NY (US)

(72) Inventors: Lukasz Jakub Palus, Cracow (PL); Grzegorz P. Szczepanik, Cracow (PL); Krzysztof Rudek, Nowy Wisnicz (PL); Tomasz Hanusiak, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 16/131,187

(22) Filed: Sep. 14, 2018

(65) Prior Publication Data

US 2020/0089814 A1    Mar. 19, 2020

(51) Int. Cl.
 *G06F 16/955*  (2019.01)
 *G06F 8/65*  (2018.01)
 *G06F 16/2457*  (2019.01)

(52) U.S. Cl.
 CPC ............ *G06F 16/955* (2019.01); *G06F 8/65* (2013.01); *G06F 16/2457* (2019.01)

(58) Field of Classification Search
 CPC ...... G06F 16/955; G06F 16/2457; G06F 8/65; G06F 8/71; G06F 9/44505; G06F 8/61;
 (Continued)

(56) References Cited

U.S. PATENT DOCUMENTS

| 7,203,962 B1 * | 4/2007 | Moran ................. G06F 21/52 726/23 |
| 7,739,282 B1 * | 6/2010 | Smith .................. H04L 67/22 707/736 |

(Continued)

FOREIGN PATENT DOCUMENTS

WO    2011085647 A1    7/2011

OTHER PUBLICATIONS

Anonymous, "Software Signature creation automation based on monitoring of Software Installation Process and changes made on file system and registry," IP.com, An IP.com Prior Art Database Technical Disclosure, IP.com No. IPCOM000244840D, IP.com Electronic Publication Date: Jan. 21, 2016, 2 pages.

*Primary Examiner* — Pierre M Vital
*Assistant Examiner* — Andalib F Lodhi
(74) *Attorney, Agent, or Firm* — Robert Shatto, Esq.; Blanche E. Schiller, Esq.; Heslin Rothenberg Farley & Mesiti P.C.

(57) ABSTRACT

A method for detecting software installed on a computer may be provided. The method may comprise obtaining a default user identifier, collecting an installed user identifier, performing an identifier comparison by comparing the installed user identifier with the default user identifier and determining whether an installed user identifier matches a default user identifier, assigning a probability value based on the identifier comparison, performing a threshold comparison of the probability value to the a predetermined threshold value, determining whether the probability value exceeds the threshold value, and in response to determining that the probability value exceeds the threshold value, concluding that the software has been installed on the computer system.

12 Claims, 4 Drawing Sheets

(58) Field of Classification Search
CPC ...... G06F 16/22; G06F 16/258; G06F 16/735; G06F 16/7867; G06F 16/972
See application file for complete search history.

(56) References Cited

U.S. PATENT DOCUMENTS

| | | |
|---|---|---|
| 8,489,616 B2 | 7/2013 | Mayo et al. |
| 8,881,131 B2 | 11/2014 | Capomassi et al. |
| 2003/0195949 A1* | 10/2003 | Slivka ........................ G06F 8/65 709/219 |
| 2007/0083559 A1* | 4/2007 | Harris ...................... G06F 21/10 |
| 2014/0089274 A1* | 3/2014 | Gocek ................. G06F 11/0766 707/692 |
| 2016/0055327 A1* | 2/2016 | Moran ............... G06K 9/00899 726/19 |
| 2016/0065558 A1* | 3/2016 | Suresh .................... G06F 21/31 726/7 |
| 2016/0092768 A1* | 3/2016 | Patil ......................... G06F 8/61 706/46 |
| 2017/0286095 A1 | 10/2017 | Grabska et al. |
| 2018/0189048 A1* | 7/2018 | Bala ......................... G06F 8/65 |

* cited by examiner

SOFTWARE DETECTION BASED ON USER ACCOUNTS

BACKGROUND

The invention relates generally to a method for detecting software, and more specifically, to a computer-implemented method for detecting the presence of software installed on a computer in complex IT environments. The invention relates further to a software detection system for detecting the presence of software installed on a computer, and a related computer program product.

Modern data centers are advantageously managed using system management software or software asset management systems. These may need comprehensive data about installed software of the computing systems under control. However, there may be circumstances that lead to a mismatch between software products that may be registered in a software catalog, such as a registry, and software that is actually installed and used on a given computing system or peripheral device ("actually-installed" software). To properly manage computing systems and user licenses in accordance with compliance rules and contractual requirements, it may be necessary to detect actually-installed software on a given computing system and/or data center landscape.

SUMMARY

Some embodiments of the present disclosure can be illustrated as a method for detecting a software installed on a computer system. The method may comprise obtaining a first default user identifier. The method may also comprise collecting a first installed user identifier from the computer system. The method may further comprise performing a first identifier comparison of the first default user identifier to the first installed user identifier. The method may also comprise determining, based on the first identifier comparison, that the first default user identifier matches the first installed user identifier. The method may also comprise assigning a probability value based on the first identifier comparison. The method may further comprise performing a threshold comparison of the probability value to a predetermined threshold value. The method may also comprise determining, based on the threshold comparison, that the probability value exceeds the threshold value. The method may further comprise concluding, based on the determining that the probability value exceeds the threshold value, that the software has been installed on the computer system.

Some embodiments of the present disclosure can be illustrated as a system comprising a processor. The system may also comprise a memory in communication with the processor. The system may also comprise the memory containing program instructions. The system may also comprise that the program instructions, when executed by the processor, are configured to cause the processor to perform a method for detecting a software installed on a computer system. The system may further comprise the method comprising obtaining a default user identifier. The system may also comprise obtaining an installed user identifier. The system may further comprise comparing the default user identifier to the installed user identifier. The system may also comprise indicating a matching identifier in response to the default user identifier matching the installed user identifier. The system may further comprise assigning a probability value based on a matching identifier quantity. The system may also comprise performing a first threshold comparison of the probability value to a predetermined threshold value. The system may further comprise determining that the software is detected on the computer system when the probability value exceeds the threshold value.

Some embodiments of the present disclosure can be illustrated as a computer program product comprising a computer readable storage medium. The computer program product may also comprise the computer readable storage medium having program instructions embodied therewith. The computer program product may also comprise the program instructions being executable by a computer. The computer program product may also comprise the program instructions executable to cause the computer to obtain a default user identifier. The computer program product may also comprise the program instructions executable to cause the computer to obtain an installed user identifier. The computer program product may also comprise the program instructions executable to cause the computer to compare the default user identifier to the installed user identifier. The computer program product may also comprise the program instructions executable to cause the computer to indicate a matching identifier when the default user identifier matches the installed user identifier. The computer program product may also comprise the program instructions executable to cause the computer to assign a probability value based on a matching identifier quantity. The computer program product may also comprise the program instructions executable to cause the computer to compare the probability value to a predetermined threshold value. The computer program product may also comprise the program instructions executable to cause the computer to determine, based on the comparing the probability value to the predetermined threshold value, that the probability value does not exceed the threshold value. The computer program product may also comprise the program instructions executable to cause the computer to conclude that the software is not detected on the computer system based on the determining.

The above summary is not intended to describe each illustrated embodiment or every implementation of the present disclosure.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Embodiments of the invention will be described, by way of example only, and with reference to the following drawings.

DETAILED DESCRIPTION

In the context of this description, the following conventions, terms and/or expressions may be used:

Detecting, in particular, detecting software refers to identifying a given software or similar installed on a selected computer system.

Software may be any artifact that may be stored and/or installed on a computer system. This may comprise executable computer programs, components, packages and/or systems. It may also comprise read-only content, such as documents, directories, catalogs, books or other computer-readable information.

A software catalog may be an at least two-dimensional table—or equivalent—having names of software components or similar stored in it. A software catalog may include a set of alpha-numeric characters for identifying software components and/or for identifying one or more default users. A software catalog may also include records, such as timestamps, that indicate a sequence of installing identifying components. In some embodiments, a tree-like structure may also be used.

The proposed computer-implemented method for detecting software installed on a computer may offer multiple advantages and technical effects:

The present invention addresses several problems central to computing, such as efficiently managing software updates across computer networks, verifying the authenticity of software, and managing software licenses.

First, to ensure secure networks, entities such as large corporations and government agencies must rigorously maintain software updates across their networked computers. Such a task presents unique challenges, as computers may be located in many geographic locations, computers may be accessible or inaccessible depending on when a user may be connected to the network, and varying hardware and/or software specifications among the computers may affect how or when a software update can be implemented. The present invention may provide an efficient approach to addressing these challenges, as the present invention is applicable to determining whether software requiring an update is present on a computer.

Next, the present invention is further applicable to determining whether software requiring removal is present on a computer. For example, the present invention may facilitate the detection of pirated or unauthorized software present within large networks.

Last, the present invention is further applicable to managing large numbers of software licenses across computer networks. Entities, such as large corporations or government agencies must monitor the quantity and the status of multiple software licenses in dynamic environments where computers may be relocated, repurposed, or reassigned. Such dynamic environments may provide additional challenges to managing software licenses, and those challenges are addressed by the present invention.

Embodiments of the present invention calculate a probability value that represents a likelihood that a software in question is actually-installed software. The probability value is based on whether "default user identifiers" match "installed user identifiers" when the two are compared.

A default user identifier may describe an internal computer identification, such as a set of alpha-numeric characters, that may be used to identify a user of a given software on a computer system. A default user identifier may be defined and may be installed on the computer system during an installation of corresponding software.

An installed user identifier may describe an internal computer identification, such as a set of alpha-numeric characters, that is installed on a computer system to identify a user of a software product that may be installed on the computer system.

The assigned probability value representing a likelihood that a software in question is actually-installed software may be increased by at least one criterion, such as a number, or quantity, of matching identifiers (i.e., a number of instances in which a default user identifier matches an installed user identifier), a predefined sequence of installed user identifiers, or an uninterrupted sequence of installed user identifiers. Furthermore, a threshold probability value for determining that a software in question is actually-installed software may be user-defined and may be adaptable to various computing environments, (e.g., large cloud user computing environments and small-scale workstations).

According to some embodiments of the method, upon finding a series of matching identifiers for a software in question, if a time-related sequence of creation times of the installed user identifiers corresponds to a predefined succession, then the probability value for actually-installed software may be increased. For example, if installation timestamps associated with the creation of a series of installed user identifiers on a computer system show that each installed user identifier was created within a predetermined time, such as within an hour, of a previous installed user identifier in the series, then the probability value may be increased.

According to some embodiments of the method, the probability value assigned upon finding a series of matching identifiers for a software in question may be increased if an uninterrupted sequence of installed user identifiers is found. In an uninterrupted sequence of installed user identifiers, no installed user identifiers except those for the software in question are present in the sequence. For example, if a series of matching identifiers for software X were found, then the sequence of installed user identifiers may be uninterrupted in some embodiments if only installed user identifiers for software X were present within a predetermined time period, such as a two-hour time period. In another example, the sequence of installed user identifiers for software X may be uninterrupted in some embodiments if a threshold number of identifiers for software X were installed sequentially.

An uninterrupted sequence of installed user identifiers may be found through an analysis of installation timestamps associated with the creation of installed user identifiers on a computer system. Furthermore, an uninterrupted sequence of installed user identifiers may indicate that the installed user identifiers were created in a sequence defined by an installation script for the software in question. Accordingly, such an uninterrupted sequence would indicate that actually-installed software was likely present on the computer system.

The assigned probability value for actually-installed software may be further modified and confirmed using additional software detection methods. This combination may allow identification of software installed on the computer system with increased accuracy. Thus, license management efforts in large scale computing environments, comprising a plurality of servers and workstations may be reduced. Further, the risk of license-agreement infringement may be reduced significantly using the method of the present invention.

According to some embodiments, the default user identifiers in the software catalog may be operating system specific. For example, a default user for a software product in one operating system environment (e.g., Linux) may be denoted as "db2inst" and in another operating system environment (e.g., z/OS) the same default user may be denoted as "db2admin." Similar examples may exist for other operating systems. Additionally, the identifiers of the different default users may be software program specific.

According to some embodiments, the method may comprise maintaining a software catalog comprising, for each software product, a software name and a list of default user identifiers. Such software catalog maintenance may only be needed once and may be reused every time the above-proposed method is executed. The created software catalog may also be used by a plurality of the above-proposed methods being executed in parallel on and for different computer systems in different computing environments, i.e., networks.

According to some embodiments, the method of the present invention may also comprise applying a second and/or third software detection method for modifying the probability value for actually-installed software. Thus, a second and/or third software detection method and/or system may be implemented together with the here proposed concepts in order to confirm an identification of the software product or package in question.

According to some embodiments of the method, the collecting of user identifiers may be performed by a central computer system for another computer system linked to the central computer, such as via a network. Thus, a software detection process may be performed on a central or dedicated computing system for a plurality of other computer systems, e.g., other servers and/or endpoint systems. Thus, the method is compatible with an active directory.

The present invention may also improve the efficiency of a central computer that provides software updates or installations to networked computers. For example, utilizing the present invention, such a computer could organize and/or prioritize groups of software or installations updates based on the presence of software on the networked computers. Accordingly, the present invention may permit a faster execution of those tasks.

According to some embodiments, the method may be a component of a software asset management method. Thus, the method and system of the present invention may be integrated into other software detection methods for improved software detection.

According to some embodiments of the method, the method may be performed regularly, (e.g., due to a fixed schedule and according to specific trigger events such as an installation of a new software package, maintenance events and/or other software inventory activities). The present invention is further applicable to performing routine maintenance on computers. For example, in diagnosing or troubleshooting computer problems, it may be beneficial to determine the configuration of the computer, such as the operating system being used, potentially problematic software that has been installed on the computer, or whether the software on the computer has been updated to the latest version.

According to some embodiments of the method, the software may be a server software component or an end user software component. Consequently, a software program, enabled to control a computer system to execute the proposed method, may be executed on any endpoint or server system in a given network (e.g., a computing center comprising a plurality of servers and endpoint systems) in order to identify software programs, components, packages and/or systems.

In the following, a detailed description of the figures will be given. First, a block diagram of an embodiment of the computer-implemented method for detecting software installed on a computer is given. Afterwards, further embodiments, as well as embodiments of the software detection system for detecting software installed on a computer, will be described.

Figure 1:
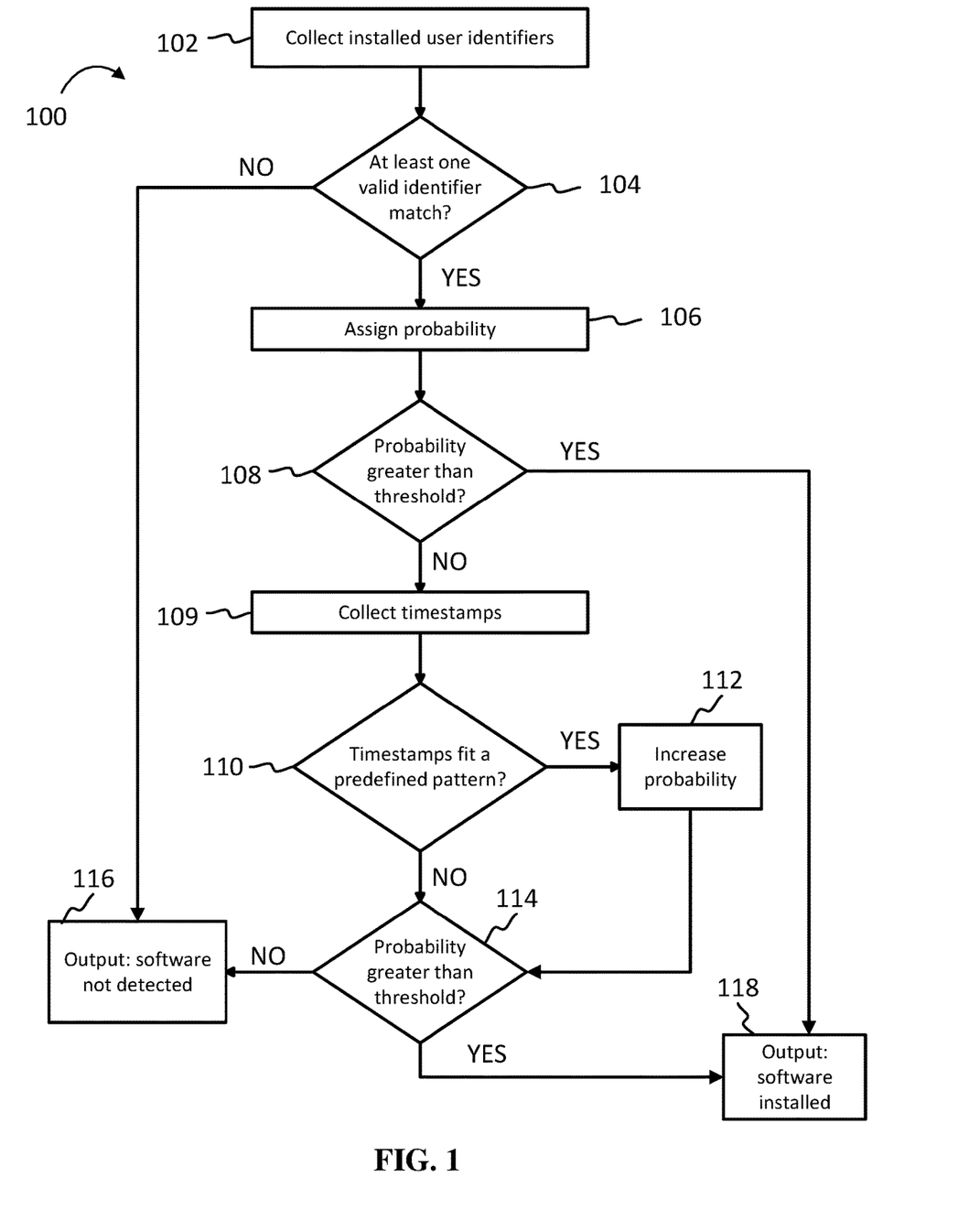
FIG. 1 shows a block diagram of a computer-implemented method for detecting software installed on a computer, in accordance with embodiments.

FIG. 1 shows a block diagram of an embodiment of the computer-implemented method 100 for detecting a software (a software product, software package, software system, or one or more software components) installed on a computer. In a more general form, the method permits the detection of a plurality of software programs on a plurality of distributed, networked computer systems.

The method 100 comprises collecting 102 (e.g., by scanning, searching or crawling through system information of the computer or computers in question) installed user identifiers for a software in question on the computer. This may also include a search through remote and/or centrally organized user directories like an active directory, etc.

The method 100 further comprises comparing, 104, the installed user identifiers with default user identifiers from a source, such as a software catalog, thereby identifying whether one or more installed user identifiers match one or more default user identifiers in the software catalog. If no matching identifiers are found, then an output 116 is generated indicating that the software in question has not been detected on the computer, and a step, such as requesting a software installation is taken. If at least one matching identifier is found, then a probability value is assigned 106 for the software in question. The probability value represents a likelihood that the software in question is actually-installed software.

In some embodiments, the number, or quantity, of matching identifiers may be directly proportional to the probability value; thus, each matching identifier may incrementally increase the likelihood that the software in question is actually-installed software. For example, finding only one matching identifier may result in a lower probability value than finding two or more matching identifiers. Furthermore, the probability value may be derived from a weighted sum of identifier probabilities corresponding to respective matching identifiers, such that a first matching identifier may increase the probability value more than each subsequent matching identifier. For example, for a software product named DB2, the following formula may be used to calculate the probability that the software is actually installed:

$$P_{DB2,\ Y}=P1/1+P2/2+P3/3+\ldots+PN/N,\ N\in\mathbb{N},$$
wherein $P_{DB2,\ Y}$=probability value representing the likelihood that a software DB2 is installed on computer system Y, P1=probability that the software is installed given that installed user identifier 1 exists on system Y and is a matching identifier, P2=probability that the software is installed given that installed user identifier 2 exists on system Y and is a matching identifier, and P3=probability that the software is installed given that installed user identifier 3 exists on system Y and is a matching identifier.

In the above example, the identifier probabilities (i.e. P1, P2, P3, PN) may be preestablished and stored in a database with default user names. The identifier probabilities may also be smaller than 0.5 to ensure that the total probability is smaller than 1.

The method 100 further comprises comparing, 108, the probability value to a predetermined threshold value. If the probability value meets or exceeds the threshold value, then an output 118 is generated indicating that the software in question is installed on the computer, and a step, such as installing an update to the software, is taken. If the probability value does not meet the threshold value, then for at least one matching identifier, an installation timestamp corresponding to the time the installed user identifier was created on the computer is collected 109.

The method 100 also comprises analyzing, 110, the installation timestamps of the installed user identifiers to determine whether the timestamps demonstrate at least one predetermined pattern. For example, a comparison of the timestamps may demonstrate that the installed user identifiers were created within a predetermined time period or that the installed user identifiers were created in an uninterrupted sequence. If the timestamps demonstrate such a predetermined pattern, then the probability value is increased 112.

The method 100 further comprises comparing, 114, the probability value to a predetermined threshold value. If the probability value meets or exceeds the threshold value, then an output 118 is generated indicating that the software in question is installed on the computer, and a step, such as uninstalling the software is taken. If the probability value does not meet the threshold value, then an output 116 is generated indicating that the software in question has not been detected on the computer, and a step, such as prioritizing the computer for a software installation is taken.

The method 100 may be executed for every software name or, in some instances, for a predetermined number of software names present in a software catalog.

Figure 2:
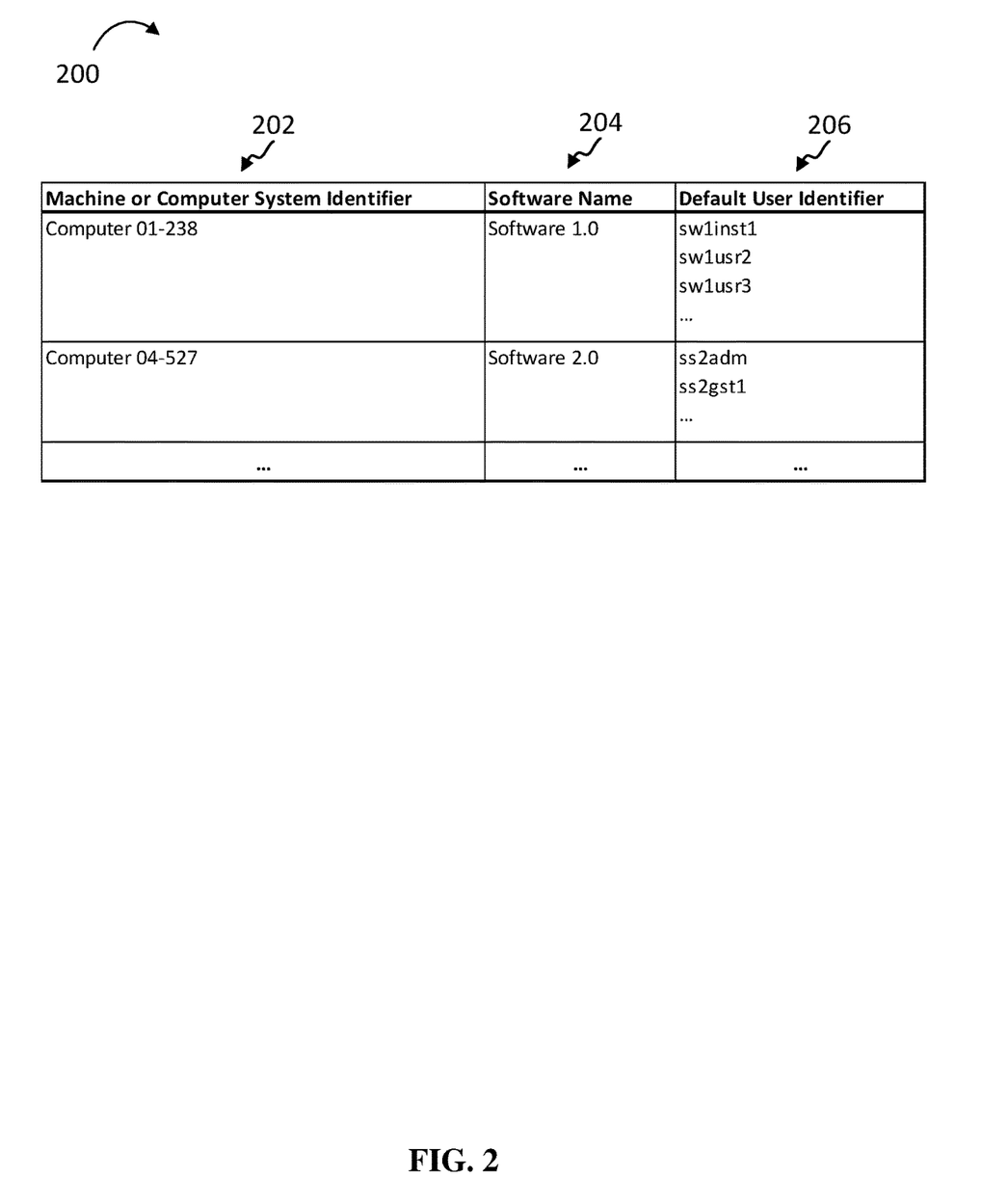
FIG. 2 shows a block diagram of an exemplary table of a data file supporting a method and system, in accordance with embodiments.

FIG. 2 shows a block diagram of an exemplary table 200 that may be utilized to support the present invention. The exemplary table comprises three columns 202, 204, 206 with a plurality of rows. The first column 202 may comprise a machine or computer system identifier. The second column 204 may comprise a name of the software in question. As examples, software packages named "Software 1.0" and "Software 2.0" are shown. Additionally, in the third column 206, a sequence of default user identifiers is shown. At least one default user identifier for a given software name may be included. In the case that more than one default user identifier may be available, the sequence of different default user identifiers may support one aspect of the proposed method. In particular, the fact that default user identifiers may be installed on a computer system in a predefined sequence may be used to increase the probability that a specific software program, component or package is installed.

Figure 3:
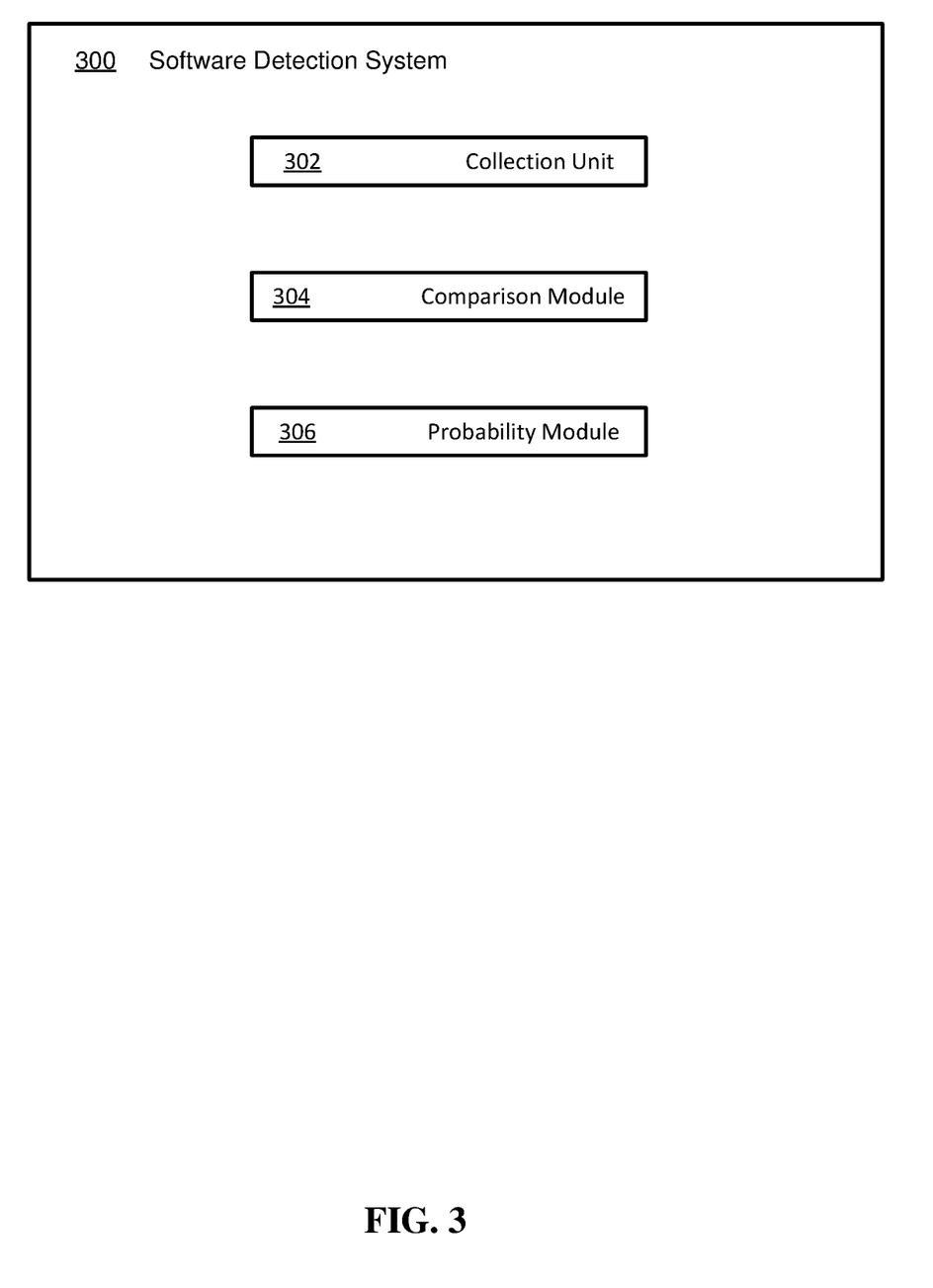
FIG. 3 shows a block diagram of a system for detecting software installed on a computer, in accordance with embodiments.

FIG. 3 shows a block diagram of an embodiment of a system 300 for detecting software installed on a computer. The software detection system comprises a collection unit 302 adapted for collecting installed user identifiers and their corresponding installation timestamps from the computer, a comparison module 304 adapted for comparing the collected installed user identifiers with default user identifiers from a source, such as a software catalog, thereby identifying one or more installed user identifiers matching one or more default user identifiers in the software catalog. The system 300 further comprises a probability module 306 adapted for assigning a probability value to the software in question.

The probability module 306 is also adapted for comparing installation timestamps of the matching identifiers if several matching identifiers for the software in question have been found, and for increasing the probability value for actually-installed software if the timestamps demonstrate at least one predetermined pattern.

Furthermore, the probability module 306 is also adapted for determining that the software in question is installed on the computer if the probability value reaches a threshold value.

Figure 4:
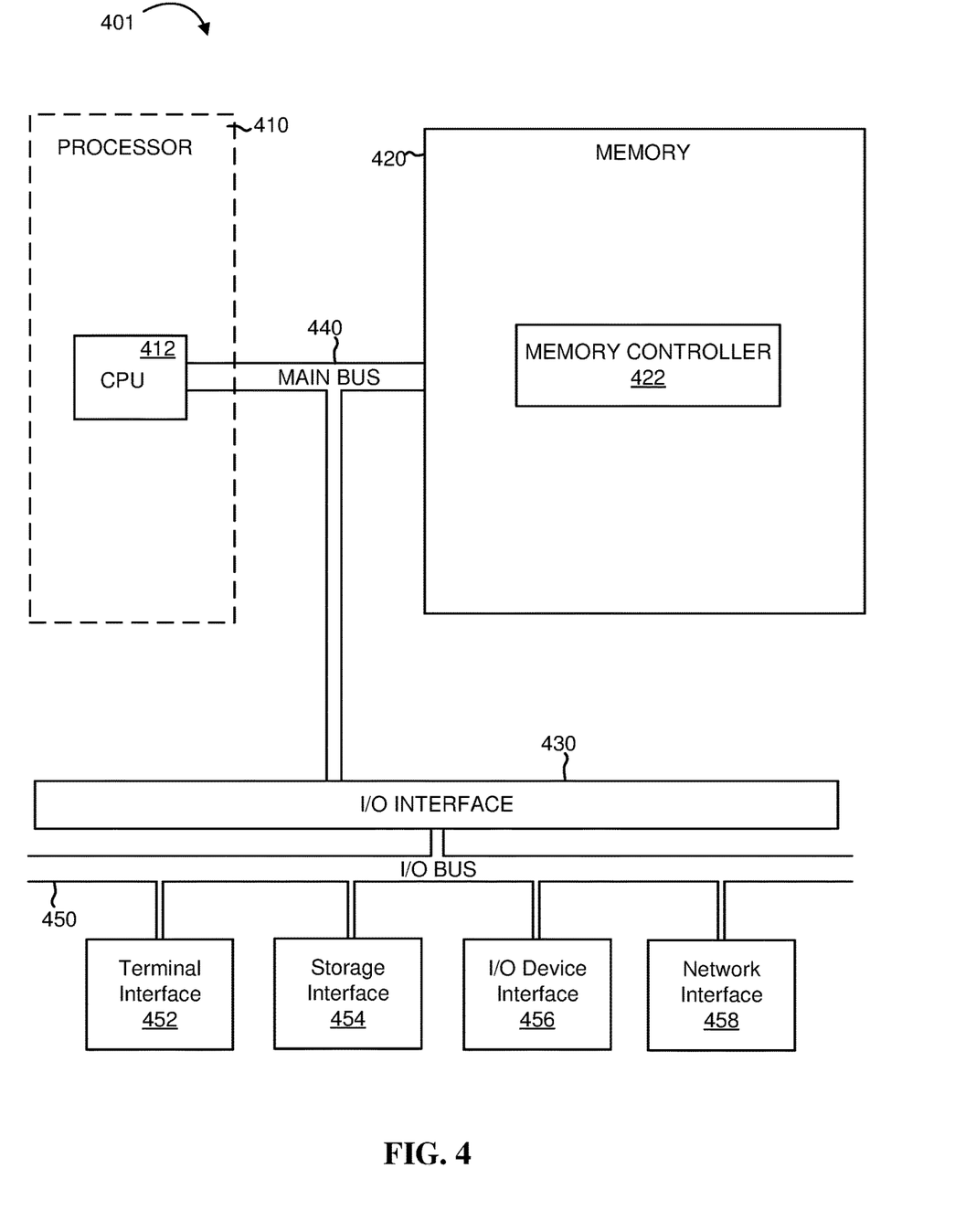
FIG. 4 shows the representative major components of a computer system that may be used in accordance with embodiments.

FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420.

The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for detecting a software installed on a computer system comprising:
   obtaining a first default user identifier,
   collecting a first installed user identifier and a second installed user identifier from the computer system,
   performing a first identifier comparison of the first default user identifier to the first installed user identifier,
   determining, based on the first identifier comparison, that the first default user identifier matches the first installed user identifier,
   assigning a probability value based on the first identifier comparison,
   performing, at a first time, a first threshold comparison of the probability value to a predetermined threshold value,
   in response to determining in the first threshold comparison that the probability value does not exceed the predetermined threshold value, obtaining a first installation timestamp corresponding to the first installed user identifier and a second installation timestamp corresponding to the second installed user identifier,
   analyzing the obtained installation timestamps to determine whether the obtained installation timestamps demonstrate a predetermined pattern,
   increasing the probability value in response to determining that the obtained installation timestamps demonstrate the predetermined pattern, the predetermined pattern comprising an uninterrupted sequence of installed user identifiers,
   performing, at a second time subsequent to the first time and in response to the increasing the probability value, a second threshold comparison of the probability value to the predetermined threshold value,
   determining, based on the second threshold comparison, that the probability value exceeds the predetermined threshold value; and
   generating, in response to the second threshold comparison, an indication that the software is installed on the computer system.

2. The method of claim 1, wherein the method is performed prior to installing an update to the software on the computer system.

3. The method of claim 1, wherein the method is applied to detect a plurality of softwares included in a software catalog.

4. The method of claim 1, wherein the method is a component of a software asset management method.

5. A system comprising:
   a processor; and
   a memory in communication with the processor, the memory containing program instructions that, when executed by the processor, are configured to cause the processor to perform a method for detecting a software installed on a computer system, the method comprising:
      obtaining a default user identifier,
      obtaining an installed user identifier by obtaining a first installed user identifier and a second installed user identifier,
      comparing the default user identifier to the installed user identifier,
      indicating a matching identifier in response to the default user identifier matching the installed user identifier,
      assigning a probability value based on a matching identifier quantity,
      performing a first threshold comparison of the probability value to a predetermined threshold value,
      in response to determining in the first threshold comparison that the probability value does not exceed the predetermined threshold value, obtaining a first installation timestamp corresponding to the first installed user identifier,
      obtaining a second installation timestamp corresponding to the second installed user identifier,
      analyzing the obtained installation timestamps to determine whether the obtained installation timestamps demonstrate a predetermined pattern, increasing the probability value in response to determining that the obtained installation timestamps demonstrate the predetermined pattern, the predetermined pattern comprising an uninterrupted sequence of installed user identifiers, performing, in response to the increasing the probability value, a second threshold comparison of the probability value to the predetermined threshold value, determining, based on the second threshold comparison, that the probability value exceeds the predetermined threshold value, and generating, in response to the second threshold comparison, an indication that the software is installed on the computer system.

6. The system of claim 5, wherein assigning a probability value comprises calculating the probability value based on a weighted sum of identifier probabilities corresponding to respective matching identifiers.

7. The system of claim 5, wherein the software is removed from the computer system upon determining that the software is installed on the computer system.

8. The system of claim 5, wherein the method is applied to detect a plurality of softwares included in a software catalog.

9. The system of claim 5, wherein the system is a component of a software asset management system.

10. A computer program product, the computer program product comprising a computer readable storage medium having program instructions embodied therewith, the program instructions executable by a computer to cause the computer to:

obtain a default user identifier, obtain an installed user identifier by obtaining a first installed user identifier and a second installed user identifier, compare the default user identifier to the first installed user identifier, indicate a matching identifier in response to the default user identifier matching the first installed user identifier, assign a probability value based on a matching identifier quantity, compare, at a first time, the probability value to a predetermined threshold value, determine, based on the comparing the probability at the first time, that the probability value does not exceed the predetermined threshold value, obtain a first installation timestamp corresponding to the first installed user identifier, obtain a second installation timestamp corresponding to the second installed user identifier, analyze the obtained installation timestamps to determine whether the obtained installation timestamps demonstrate a predetermined pattern, the predetermined pattern comprising an uninterrupted sequence of installed user identifiers, increase the probability value in response to determining that the obtained installation timestamps demonstrate the predetermined pattern, perform, at a second time subsequent to the first time and in response to increasing the probability value, a second comparison of the probability value to the predetermined threshold value, determine, based on the second comparison, that the probability value exceeds the predetermined threshold value, and generate, in response to the second comparison, an indication that the software is installed on the computer system.

11. The computer program product of claim 10, wherein the program instructions further cause the computer to remove the software from the computer system in response to determining that the software is installed on the computer system.

12. The computer program product of claim 10, wherein the computer program product is a component of a software asset management system.

* * * * *